Nov. 8, 1960  J. H. BORNZIN  2,958,992
CUT CROP PICK UP AND BRUISING MACHINE
Filed April 11, 1958
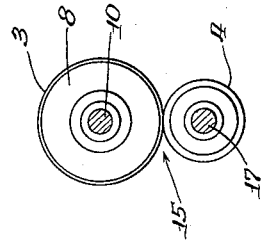
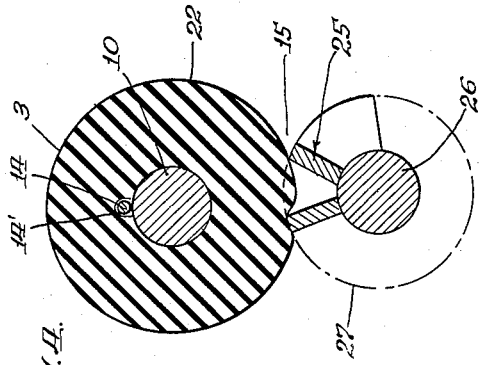
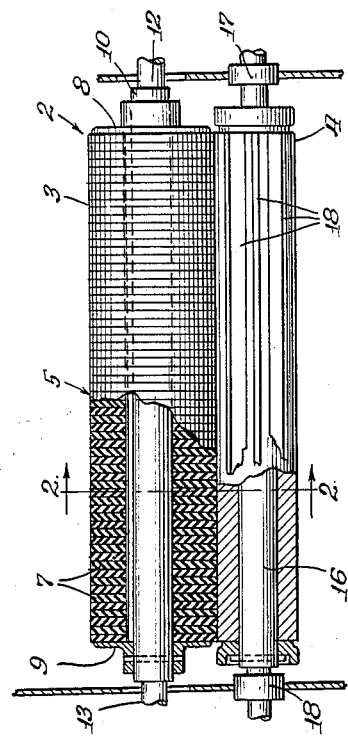
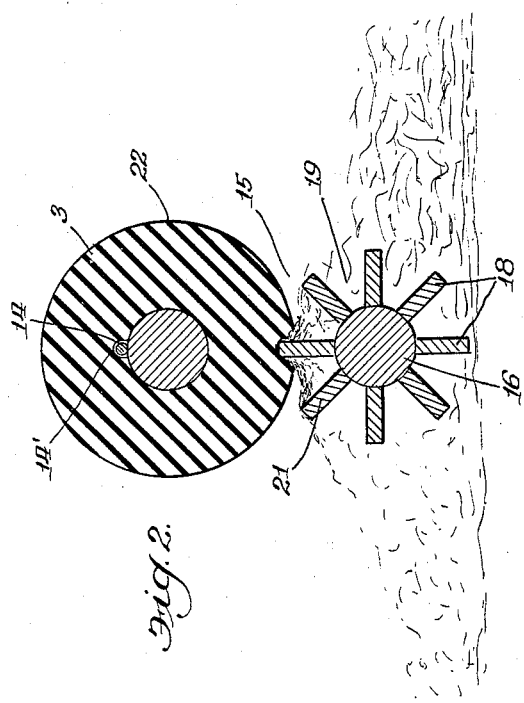
Inventor:
James H. Bornzin
Paul O. Pippel
Atty.

United States Patent Office 2,958,992
Patented Nov. 8, 1960

2,958,992
CUT CROP PICK UP AND BRUISING MACHINE

James H. Bornzin, La Grange, Ill., assignor to International Harvester Company, Chicago, Ill., a corporation of New Jersey Filed Apr. 11, 1958, Ser. No. 727,934

9 Claims. (Cl. 56—1)

This invention pertains to hay processing machines and more particularly to a novel crop bruising roll assembly adapted for use in machines of the type shown in U.S. Patent 2,811,819.

The principal object of the invention is to provide a novel assembly of rolls wherein one of the rolls is adapted to pick the hay directly from the field and direct it between the rolls and wherein the pick-up roll comprises a series of blades which cooperate with a roll which is composed of elastomer material so that the crop is bruised against a cushioning surface.

A still further object of the invention is to provide a novel crop pick-up and bruising roll assembly which scuffs the stems so as to accelerate dryings of the hay.

These and other objects of the invention will become more apparent from the specification and the drawing, wherein:

Figure 1 is a side elevational view partially in longitudinal section of one form of the roll assembly;

Figure 2 is an enlarged cross sectional view taken substantially on the line 2—2 of Figure 1;

Figure 3 is an end view of the structure shown in Figure 1; and

Figure 4 is a modified construction illustrating a different form of lower pick-up and bruising roll.

Describing the invention in detail and having particular reference to the drawings there is shown in Figures 1 through 3 a roll assembly generally designated 2 which comprises upper and lower rolls 3 and 4, the upper roll having a body portion 5 of elastomer material and is preferably made up of a series of disks 7 which are laminated into a unitary cylindrical body between a pair of end plates or clamps 8 and 9 which are suitably secured to a center shaft 10, the shaft 10 having bearing mounted end portions 12 and 13. The discs are interlocked with the shaft 10 by a hey 14 welded to the shaft 10 and extending through a complementary slot 14' in the discs.

The upper roll 3 is engaged with the lower roll 4 and provides an intake bite 15 therewithin to which the crop is fed attendant to the lower roll rotating in the direction of the arrow as well known to those skilled in the art.

The lower roll comprises a center shaft 16 which has journal end portions 17 and 18 by means of which the lower roll is mounted in suitable supported structure and the shaft or center core 16 is provided with a series of radially outwardly extending generally flat blades 18 which develop crop receiving pockets 19 therebetween. The blades carry the material upwardly through the bite 15 and contact the upper roll as at 20 and deform the upper roll in the region of contact whereby kinking and bruising the crop which is entered between. The feature of the present invention is in engaging the sharp edged outer ends 21 of the blades with the smooth faced periphery 22 of the upper roll and in deforming the upper roll in order to kink and bruise the material between.

Referring now to the embodiment of the invention shown in Figure 4 it will be observed that blades generally designated 25 are spiralled about the core 26 of the lower roll 27 thus there is continuous contact between the blades and the upper roll to eliminate the intermittent engagement and thus provide a smoother operation. However, the theory of operation of the sharp edge blade pressing into the deformable body portion of the upper roll in order to scuff and crimp the hay and particularly the stems therebetween still avails in this embodiment in which parts corresponding to those of the previous embodiment are identified with the same reference numerals.

It will be noted that there is considerable elongation in the plant when it is entered into the elastic roll as well as a scuffing action in entering and exiting. Also the upper roll is larger than the lower so that the blades do not strike the same area repeatedly.

Inasmuch as in each design the paddles or blades are spaced close enough that at least two successive blades engage the upper roll, the crop extending between the paddles on a straight line is wrapped about the bulge of the body material of the upper roll as it flows between the blades. The greater distance around the bulge causes the hay to be broken apart or to scuff between the blades and elastic body by sliding into the pockets developed between the blades. The bruising or breaking of the stems accelerates drying.

What is claimed is:

1. In a hay processing roller assembly the combination of a pair of compression rollers disposed in adjacent parallel relationship to compress plants therebetween, one of said rollers comprising a body of substantially cylindrical deformable elastomer material, and the other of said rollers having a series of radially outwardly extending blades describing an arc which intersects the periphery of the said one cylindrical roller whereby plants which are passed therebetween will become stretched and bruised plants.

2. The invention according to claim 1 and one of said rollers being disposed in close proximity to the ground for picking the crops directly therefrom.

3. In a hay processing device, the combination of upper and lower rolls, said upper roll being substantially larger diametrically than the lower roll and having a body of deformable elastomer material, said lower roll having a series of circumferentially spaced paddles of a length substantially greater than the distance from the axis of the lower roll to the periphery of the upper roll and kneading the upper roll with the engagement of plants passing therewith for scuffing the hay passing therebetween.

4. The invention according to claim 3 and said paddles spiralled about the axis of the lower roll.

5. In a hay treating apparatus of the type comprising an ambulatory support and upper and lower rolls disposed in cooperative relation and the lower roll positioned for picking the crop from the field and entering it between the rolls pursuant to predirectional rotation of the rolls, the improvement comprising: one of said rolls having a body of relatively soft elastomer material with a generally smooth peripheral contour and the other roll having radially outwardly projecting rigid bar members arranged to deflect said body radially inwardly with the passage of crops entered therebetween, said members spaced circumferentially of said other roll a distance such that at least two of the bars simultaneously engage the crop with said one roll.

6. The invention according to claim 5 and further characterized in that said upper roll is larger and comprises the elastomer body.

7. The invention according to claim 5 and said rigid bar members comprising paddles spiralled about the axis of the lower roll.

8. The invention according to claim 5 and said paddles spaced a distance such that at least two successive paddles engage the roll at one time.

9. In a hay processing roller assembly, the combination of a pair of compression rollers disposed in adjacent parallel relationship to compress plants therebetween, one of said rollers comprising a substantially cylindrical body of deformable elastomer material, and the other of said rollers having a series of radially outwardly extending blades describing an arc which is substantially coincidental with the periphery of the said one roller whereby plants which are passed therebetween will become stretched and bruised.

References Cited in the file of this patent

UNITED STATES PATENTS

| | | |
|---|---|---|
| 1,972,680 | Cushman | Sept. 4, 1934 |
| 2,711,622 | Cunningham | June 28, 1955 |
| 2,731,782 | Mason | Jan. 24, 1956 |